(12) United States Patent
Soni et al.

(10) Patent No.: US 11,010,642 B2
(45) Date of Patent: May 18, 2021

(54) CONCURRENT IMAGE AND CORRESPONDING MULTI-CHANNEL AUXILIARY DATA GENERATION FOR A GENERATIVE MODEL

(71) Applicant: General Electric Company, Schenectady, NY (US)

(72) Inventors: Ravi Soni, San Ramon, CA (US); Gopal B. Avinash, San Ramon, CA (US); Min Zhang, San Ramon, CA (US)

(73) Assignee: General Electric Company, Schenectady, NY (US)

(*) Notice: Subject to any disclaimer, the term of this patent is extended or adjusted under 35 U.S.C. 154(b) by 129 days.

(21) Appl. No.: 16/368,101

(22) Filed: Mar. 28, 2019

(65) Prior Publication Data

US 2020/0311482 A1 Oct. 1, 2020

(51) Int. Cl.
*G06K 9/62* (2006.01)
*G06N 20/00* (2019.01)

(52) U.S. Cl.
CPC ........... *G06K 9/6262* (2013.01); *G06K 9/628* (2013.01); *G06K 9/6277* (2013.01); *G06N 20/00* (2019.01)

(58) Field of Classification Search
CPC .......... G06T 3/4046; G06T 7/10; G06F 7/588
USPC ....................................... 382/170, 160, 199
See application file for complete search history.

(56) References Cited

U.S. PATENT DOCUMENTS

| 2018/0260957 | A1  | 9/2018  | Yang |
| 2018/0373979 | A1* | 12/2018 | Wang ................. G06K 9/00671 |
| 2019/0046068 | A1  | 2/2019  | Ceccaldi |
| 2019/0066133 | A1* | 2/2019  | Cotton .................... G06N 5/04 |
| 2019/0080206 | A1  | 3/2019  | Hotson |
| 2019/0086498 | A1* | 3/2019  | Zheng ................ G01R 33/5608 |
| 2019/0244060 | A1* | 8/2019  | Dundar ............... G06K 9/6256 |

OTHER PUBLICATIONS

Zhu et al., "Adversarial Deep Structured Nets for Mass Segmentation from Mammograms", arXiv:1710.09288v2 [cs.CV], Dec. 25, 2017, 4 pages.
Wang et al., "Adversarial neural networks for basal membrane segmentation of micro-invasive cervix carcinoma in histopathology images", Proceedings of the 2017 International Conference on Machine Learning and Cybernetics, Jul. 9-12, 2017, 5 pages.
Huo et al., "Adversarial Synthesis Learning Enables Segmentation Without Target Modality Ground Truth", 4 pages.

(Continued)

*Primary Examiner* — Kiet M Doan
(74) *Attorney, Agent, or Firm* — Amin, Turocy & Watson, LLP

(57) ABSTRACT

Systems and techniques for providing concurrent image and corresponding multi-channel auxiliary data generation for a generative model are presented. In one example, a system generates synthetic multi-channel data associated with a synthetic version of imaging data. The system also predicts multi-channel imaging data and the synthetic multi-channel data with a first predicted class set or a second predicted class set. Furthermore, the system employs the first predicted class set or the second predicted class set for the synthetic multi-channel data to train a generative adversarial network model.

15 Claims, 11 Drawing Sheets

(56) References Cited

OTHER PUBLICATIONS

Moeskops et al., "Adversarial training and dilated convolutions for brain MRI segmentation", arXiv:1707.03195v1 [cs.CV], Jul. 11, 2017, 8 pages.
Yang et al., "Automatic Liver Segmentation Using an Adversarial Image-to-Image Network", arXiv:1707.08037v1 [cs.CV], Jul. 25, 2017, 8 pages.
Li et al., "Brain Tumor Segmentation Using an Adversarial Network", Springer Nature, 2018, pp. 123-132, 10 pages.
Li et al., "cC-GAN: A Robust Transfer-learning Framework for HEp-2 Specimen Image Segmentation", IEEE, 2018, 11 pages.
Rezaei et al., "Conditional Adversarial Network for Semantic Segmentation of Brain Tumor", arXiv:1708.05227v1 [cs.CV], Aug. 17, 2017, 10 pages.
Rezaei et al., "Conditional Generative Refinement Adversarial Networks for Unbalanced Medical Image Semantic Segmentation", arXiv:1810.03871v1 [cs.CV], Oct. 9, 2018, 11 pages.
Zhang et al., "Deep Adversarial Networks for Biomedical Image Segmentation Utilizing Unannotated Images", Springer International, 2017, pp. 408-416, 9 pages.
Mondal et al., "Few-shot 3D Multi-modal Medical Image Segmentation using Generative Adversarial Learning", arXiv:1810.12241v1 [cs.CV], Oct. 29, 2018, 10 pages.
Izadi et al., "Generative Adversarial Networks to Segment Skin Lesions", IEEE 15th International Symposium on Biomedical Imaging, Apr. 4-7, 2018, 4 pages.
Udrea et al., "Generative Adversarial Neural Networks for Pigmented and Non-Pigmented Skin Lesions Detection in Clinical Images", 21st International Conference on Control Systems and Computer Science, 2017, 5 pages.
Shankaranarayana et al., "Joint Optic Disc and Cup Segmentation Using Fully Convolutional and Adversarial Networks", Springer International, 2017, pp. 168-176, 9 pages.
Zhang et al., "Multi-Input and Dataset-Invariant Adversarial Learning (MDAL) for Left and Right-Ventricular Coverage Estimation in Cardiac MRI", Springer Nature, 2018, pp. 481-498, 9 pages.
Son et al., "Retinal Vessel Segmentation in Fundoscopic Images with Generative Adversarial Networks", arXiv:1706.09318v1 [cs.CV], Jun. 28, 2017, 9 pages.
Lahiri et al., "Retinal Vessel Segmentation under Extreme Low Annotation: A Generative Adversarial Network Approach", arXiv:1809.01348v1 [cs.CV], Sep. 5, 2018, 9 pages.
Dai et al., "SCAN: Structure Correcting Adversarial Network for Organ Segmentation in Chest X-rays", arXiv:1703.08770v2 [cs.CV], Apr. 10, 2017, 10 pages.
Xue et al., "SegAN: Adversarial Network with Multi-scale L1 Loss for Medical Image Segmentation", arXiv:1706.01805v2 [cs.Cv], Jul. 16, 2017, 9 pages.
Huo et al., "Splenomegaly Segmentation using Global Convolutional Kernels and Conditional Generative Adversarial Networks", 7 pages.
Jiang et al., "Tumor-aware, Adversarial Domain Adaptation from CT to MRI for Lung Cancer Segmentation", 8 pages.
Dou et al., "Unsupervised Cross-Modality Domain Adaptation of ConvNets for Biomedical Image Segmentations with Adversarial Loss", arXiv:1804.10916v2 [cs.CV], Jun. 19, 2018, 7 pages.
Kamnitsas et al., "Unsupervised domain adaptation in brain lesion segmentation with adversarial networks", arXiv:1612.08894v1 [cs.CV], Dec. 28, 2016, 13 pages.
Rezaei et al., "Whole-Heart-Heartand Great Vessel Segmentation with Context-Aware of Generative Adversarial Networks", 6 pages.
Avendi, "GAN for Medical Imaging: Generating Images and Annotations", https://medium.com/randomai/gan-for--medical-imaging-generating-images-and-annotations-8ad7c778809c, Feb. 24, 2018, 6 pages.
EP application 20165053.8 filed Mar. 23, 2020—extended Search Report dated Jul. 21, 2020, 9 pages.

* cited by examiner

CONCURRENT IMAGE AND CORRESPONDING MULTI-CHANNEL AUXILIARY DATA GENERATION FOR A GENERATIVE MODEL

TECHNICAL FIELD

This disclosure relates generally to artificial intelligence.

BACKGROUND

Artificial Intelligence (AI) can be employed for classification and/or analysis of digital images. For instance, AI can be employed for image recognition. In certain technical applications, AI can be employed for generative modeling such as, for example, a generative adversarial network, to learn data distributions. However, training a generative model and/or generating high quality synthetic images is generally difficult to achieve. For example, accuracy and/or efficiency of pixel-level annotation for synthetic images associated with generative models is generally difficult to achieve. As such, conventional artificial intelligence techniques can be improved.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

According to an embodiment, a system includes a multi-channel generator component, a discriminator component and a training component. The multi-channel generator component generates synthetic multi-channel data associated with a synthetic version of imaging data. The discriminator component predicts multi-channel imaging data and the synthetic multi-channel data with a first predicted class set or a second predicted class set. The training component employs the first predicted class set or the second predicted class set for the synthetic multi-channel data to train a generative adversarial network model.

According to another embodiment, a method is provided. The method comprises generating synthetic multi-channel data associated with a synthetic version of imaging data. The method also comprises predicting multi-channel imaging data and the synthetic multi-channel data with a first predicted class set or a second predicted class set. Furthermore, the method comprises training a generative adversarial network model based on the first predicted class set or the second predicted class set for the synthetic multi-channel data.

According to yet another embodiment, a computer readable storage device is provided. The computer readable storage device comprises instructions that, in response to execution, cause a system comprising a processor to perform operations, comprising generating synthetic multi-channel data associated with a synthetic version of imaging data. The processor also performs operations, comprising predicting multi-channel imaging data and the synthetic multi-channel data with a first predicted class set or a second predicted class set. The processor also performs operations, comprising training a generative adversarial network model based on the first predicted class set or the second predicted class set for the synthetic multi-channel data.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
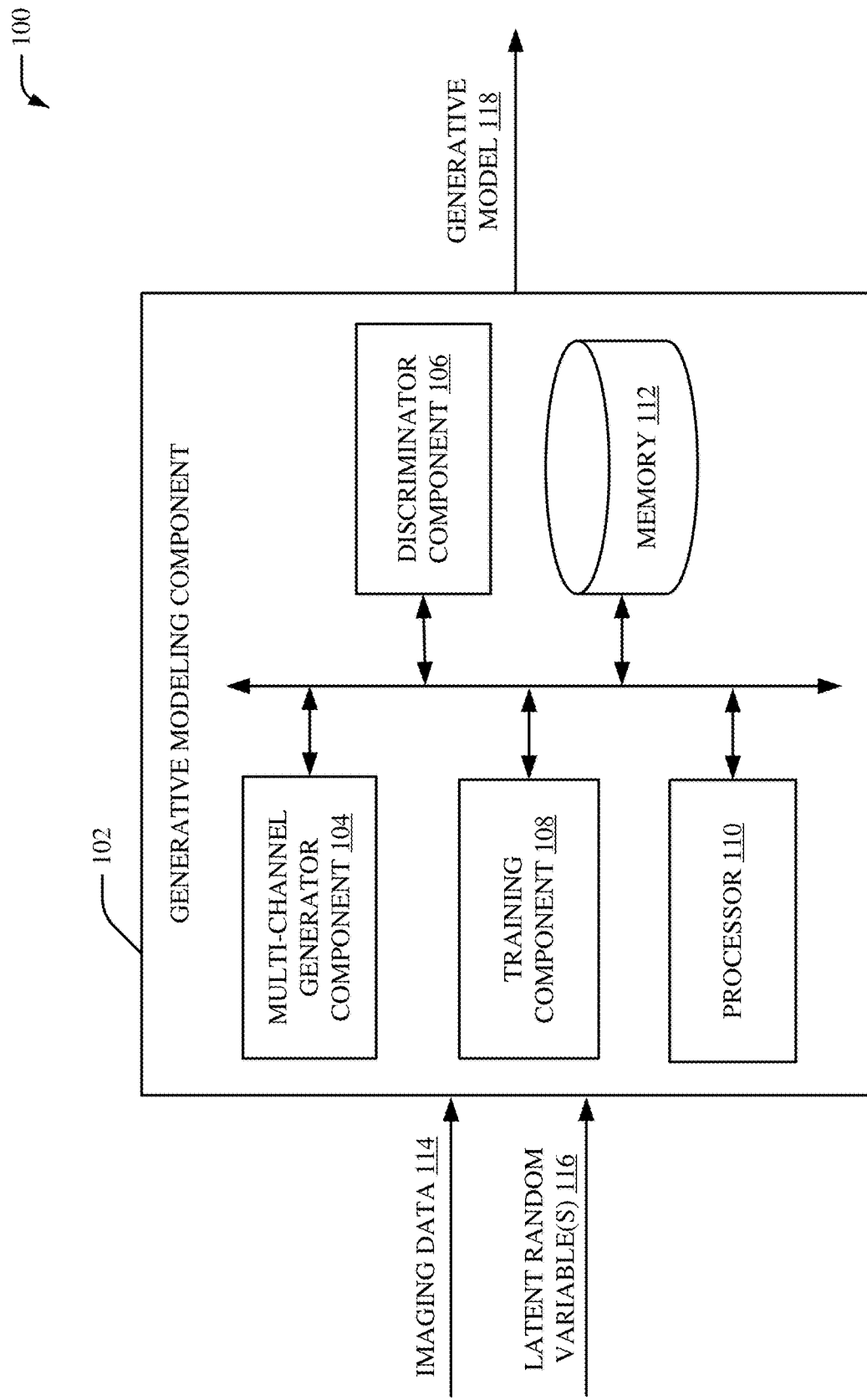
FIG. 1 illustrates a high-level block diagram of an example generative modeling component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Systems and techniques that provide concurrent image and corresponding multi-channel auxiliary data generation for a generative model are presented. For example, a novel generative adversarial network is disclosed herein. The novel generative adversarial network can include, during a training phase, a multi-channel generator that produces multi-channel data and a discriminator that receives in multi-channel data to classify real data or synthetic data. Other information such as segment information, etc. can be encoded in another channel so that learning can be concurrently performed during training. Synthetic multi-channel data can also be generated during an inferencing phase. In an embodiment, the novel generative adversarial network can employ a multi-channel generator associated with a convolutional neural network to generate a synthetic image and two or more segmentations for the synthetic image. The novel generative adversarial network can also employ a discriminator associated with a convolutional neural network to classify real images from multi-channel data related to the synthetic image and the two or more segmentations for the synthetic image. In an aspect, synthetic images for a generative adversarial network can be annotated by concurrently generating corresponding multi-channel auxiliary data. In another aspect, a generative adversarial network can be trained using a loss function that is generated based on multi-channel data generation to tune the generative adversarial network accordingly. In certain embodiments, the novel generative adversarial network can employ concurrent medical image and corresponding multi-channel auxiliary data to improve annotation related to disease detection. For example, the novel generative adversarial network can employ concurrent medical image and corresponding multi-channel auxiliary data without the need of a radiologist to annotate at a pixel level for the synthetic imagery. As such, by employing the novel generative adversarial network as described herein, detection and/or localization of one or more features associated with image data (e.g., detection and/or localization of one or more conditions for a patient associated with medical imaging data) can be improved. Furthermore, accuracy and/or efficiency for classification and/or analysis of image data (e.g., medical imaging data) can be improved. Additionally, effectiveness of a machine learning model for classification and/or analysis of image data (e.g., medical imaging data) can be improved, performance of one or more processors that execute a machine learning model for classification and/or analysis of image data (e.g., medical imaging data) can be improved, and/or efficiency of one or more processors that execute a machine learning model for classification and/or analysis of image data (e.g., medical imaging data) can be improved.

Referring initially to FIG. 1, there is illustrated an example system 100 that provides concurrent image and corresponding multi-channel auxiliary data generation for a generative model, according to one or more embodiments of the subject disclosure. The system 100 can be employed by various systems, such as, but not limited to medical device systems, medical imaging systems, medical diagnostic systems, medical systems, medical modeling systems, enterprise imaging solution systems, advanced diagnostic tool systems, simulation systems, image management platform systems, care delivery management systems, artificial intelligence systems, machine learning systems, neural network systems, modeling systems, aviation systems, power systems, distributed power systems, energy management systems, thermal management systems, transportation systems, oil and gas systems, mechanical systems, machine systems, device systems, cloud-based systems, heating systems, HVAC systems, medical systems, automobile systems, aircraft systems, water craft systems, water filtration systems, cooling systems, pump systems, engine systems, prognostics systems, machine design systems, and the like. In one example, the system 100 can be associated with a classification system to facilitate visualization and/or interpretation of medical imaging data. Moreover, the system 100 and/or the components of the system 100 can be employed to use hardware and/or software to solve problems that are highly technical in nature (e.g., related to processing digital data, related to processing imaging data, related to medical modeling, related to medical imaging, related to artificial intelligence, etc.), that are not abstract and that cannot be performed as a set of mental acts by a human.

The system 100 can include a generative modeling component 102 that can include a multi-channel generator component 104, a discriminator component 106, and a training component 108. In an embodiment, the generative modeling component 102 can be employed for a training phase. For example, the generative modeling component 102 can be employed for multi-channel generative adversarial network training. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the generative modeling component 102) can include memory 112 for storing computer executable components and instructions. The system 100 (e.g., the generative modeling component 102) can further include a processor 110 to facilitate operation of the instructions (e.g., computer executable components and instructions) by the system 100 (e.g., the generative modeling component 102).

The generative modeling component 102 (e.g., the discriminator component 106 of the generative modeling component 102) can receive imaging data 114. The imaging data 114 can be two-dimensional imaging data and/or three-dimensional imaging data generated by one or more imaging devices. For instance, the imaging data 114 can be imagery captured via a set of sensors (e.g., a set of sensors associated with an imaging device). In certain embodiments, the imaging data 114 can be a series of imagery captured via a set of sensors (e.g., a set of sensors associated with an imaging device) during an interval of time. The imaging data 114 can be received directly from one or more imaging devices. Alternatively, the imaging data 114 can be stored in one or more databases that receives and/or stores the imaging data 114 associated with the one or more imaging devices. In certain embodiments, the imaging data 114 can be medical imaging data. For example, the imaging data 114 can be two-dimensional medical imaging data and/or three-dimensional medical imaging data generated by one or more medical imaging devices. In example, the imaging data 114 can be electromagnetic radiation imagery captured via a set of sensors (e.g., a set of sensors associated with a medical imaging device). In certain embodiments, the imaging data 114 can be a series of electromagnetic radiation imagery captured via a set of sensors (e.g., a set of sensors associated with a medical imaging device) during an interval of time.

In another example, the imaging data 114 can be positron emission tomography (PET) scan imagery. In yet another example, the imaging data 114 can be magnetic resonance imaging (MRI) data. The imaging data 114 can be received directly from one or more medical imaging devices. Alternatively, the imaging data 114 can be stored in one or more databases that receives and/or stores the medical imaging data associated with the one or more medical imaging devices. A medical imaging device can be, for example, an x-ray device, a computed tomography (CT) device, a PET scanner device, an MRI device, another type of medical imaging device, etc.

In an embodiment, the imaging data 114 can be multi-channel imaging data. For example, the imaging data 114 can be a multi-channel data sample of a real image. In an aspect, the imaging data 114 can include a real version of imaging data. Additionally, the imaging data 114 can include one or more segmentations of the real version of the imaging data. For example, in an embodiment, the imaging data 114 can include a first data channel associated with a real image, a second data channel associated with first segmentation data indicative of a segmentation for the real image, and a third data channel associated with second segmentation data indicative of a remaining segmentation for the real image. In certain embodiments, the imaging data 114 can include mask data. For instance, the imaging data 114 can include one or more masks for the one or more segmentations of the real version of the imaging data. In an example, the imaging data 114 can include first mask data indicative of a first mask (e.g., a first ground truth mask) for the first segmentation data and second mask data indicative of a second mask (e.g., a second ground truth mask) for the second segmentation data. A mask included in the imaging data 114 can be a filter to mask one or more regions in the real version of the imaging data. For instance, a mask included in the imaging data 114 can include one or more weights for one or more regions of interest in the real version of the imaging data. In one example, a mask can include a set of pixels that define a location for a segmentation using binary filtering. Additionally or alternatively, the generative modeling component 102 (e.g., the multi-channel generator component 104 of the generative modeling component 102) can receive one or more latent random variables 116. The one or more latent random variables 116 can be sampled, for example, from a data distribution of random variables. For instance, the one or more latent random variables 116 can be a vector of random variables.

The multi-channel generator component 104 can generate synthetic multi-channel data based on the one or more latent random variables 116. The synthetic multi-channel data can be a multi-channel data sample. In an aspect, the synthetic multi-channel data can include a synthetic version of imaging data. Additionally, the synthetic multi-channel data can include one or more segmentations of the synthetic version of the imaging data. The synthetic version of the imaging data and the one or more segmentations can be associated with unique data channels. For example, in an embodiment, the multi-channel generator component 104 can generate a first data channel associated with a synthetic image, a second data channel associated with first segmentation data indicative of a segmentation for the synthetic image, and a third data channel associated with second segmentation data indicative of a remaining segmentation for the synthetic image. In another embodiment, the multi-channel generator component 104 can generate a first data channel associated with a synthetic image, a second data channel associated with first segmentation data indicative of a first segmentation for the synthetic image, a third data channel associated with second segmentation data indicative of a remaining portion of the first segmentation for the synthetic image, a fourth data channel associated with third segmentation data indicative of a second segmentation for the synthetic image, and a fifth data channel associated with fourth segmentation data indicative of a remaining portion of the second segmentation for the synthetic image. However, it is to be appreciated that the synthetic multi-channel data generated by the multi-channel generator component 104 can be associated with a different number of data channels and/or a different number of segmentations. In an embodiment, the synthetic multi-channel data generated by the multi-channel generator component 104 can include mask data. For instance, the multi-channel generator component 104 can generate one or more masks for the one or more segmentations of the synthetic version of the imaging data. In an example, the multi-channel generator component 104 can generate first mask data indicative of a first mask (e.g., a first ground truth mask) for the first segmentation data, the multi-channel generator component 104 can generate second mask data indicative of a second mask (e.g., a second ground truth mask) for the second segmentation data, etc. A mask included in the synthetic multi-channel data can be a filter to mask one or more regions in the synthetic version of the imaging data. For instance, a mask included in the synthetic multi-channel data can include one or more weights for one or more regions of interest in the synthetic version of the imaging data. In one example, a mask can include a set of pixels that define a location for a segmentation using binary filtering.

In another embodiment, the multi-channel generator component 104 can employ a deep neural network such as, for example, a convolutional neural network to generate the synthetic multi-channel data. In certain embodiments, the convolutional neural network can be a spring network of convolutional layers. For instance, the convolutional neural network can perform a plurality of sequential and/or parallel downsampling and/or upsampling of the one or more latent random variables 116 associated with convolutional layers of the convolutional neural network. In an example, the convolutional neural network can perform a first convolutional layer process associated with sequential downsampling of the one or more latent random variables 116 and a second convolutional layer process associated with sequential upsampling of the one or more latent random variables 116. The spring network of convolutional layers can include the first convolutional layer process associated with the sequential downsampling and the second convolutional layer process associated with sequential upsampling. The spring network of convolutional layers associated with the convolutional neural network can alter convolutional layer filters similar to functionality of a spring. For instance, the convolutional neural network can analyze the one or more latent random variables 116 based on a first convolutional layer filter that comprises a first size, a second convolutional layer filter that comprises a second size that is different than the first size, and a third convolutional layer filter that comprises the first size associated with the first convolutional layer filter.

The discriminator component 106 can predict the imaging data 114 with a first predicted class set or a second predicted class set. Additionally or alternatively, the discriminator component 106 can predict the synthetic multi-channel data with the first predicted class set or the second predicted class set. In an embodiment, a class set can include a multi-channel image (e.g., channel level labels), an image label (e.g., image level labels) and/or clinical labels. The first predicted class set can be associated with a first classification (e.g., a first classification label) and the second predicted class set can be associated with a second classification (e.g., a second classification label). For example, an image level label can correspond to a "real" label for an image (e.g., a "real" classification label) or a "fake" label for an image (e.g., a "fake" classification label). In another example, a channel level label can correspond to a "real" label for a multi-channel image (e.g., a "real" classification label) or a "fake" label for a multi-channel image (e.g., a "fake" classification label). In an embodiment, the discriminator component 106 can label the synthetic multi-channel data with a first label (e.g., a "real" label) or a second label (e.g., a "fake" label) based on the first data channel associated with the synthetic image, the second data channel associated with the first segmentation data, and the third data channel associated with the second segmentation data. In another embodiment, the discriminator component 106 can label the synthetic multi-channel data with a first label (e.g., a "real" label) or a second label (e.g., a "fake" label) based on the first data channel associated with the synthetic image, the second data channel associated with the first segmentation data, the third data channel associated with the second segmentation data, the fourth data channel associated with the third segmentation data, and the fifth data channel associated with the fourth segmentation data.

In certain embodiments, the discriminator component 106 can employ a deep neural network such as, for example, a convolutional neural network to label (e.g., classify) the imaging data 114 and/or the synthetic multi-channel data. In certain embodiments, the convolutional neural network can be a spring network of convolutional layers. For instance, the convolutional neural network can perform a plurality of sequential and/or parallel downsampling and/or upsampling of the imaging data 114 and/or the synthetic multi-channel data associated with convolutional layers of the convolutional neural network. In an example, the convolutional neural network can perform a first convolutional layer process associated with sequential downsampling of the imaging data 114 and/or the synthetic multi-channel data and a second convolutional layer process associated with sequential upsampling of the imaging data 114 and/or the synthetic multi-channel data. The spring network of convolutional layers can include the first convolutional layer process associated with the sequential downsampling and the second convolutional layer process associated with sequential upsampling. The spring network of convolutional layers associated with the convolutional neural network can alter convolutional layer filters similar to functionality of a spring. For instance, the convolutional neural network can analyze the imaging data 114 and/or the synthetic multi-channel data based on a first convolutional layer filter that comprises a first size, a second convolutional layer filter that comprises a second size that is different than the first size, and a third convolutional layer filter that comprises the first size associated with the first convolutional layer filter. In certain embodiments, the discriminator component 106 can extract information that is indicative of correlations, inferences and/or expressions from the imaging data 114 and/or the multi-channel imaging data based on the convolutional neural network. In an aspect, the discriminator component 106 can perform learning with respect to the imaging data 114 and/or the multi-channel imaging data explicitly or implicitly using the convolutional neural network. The discriminator component 106 can also employ an automatic classification system and/or an automatic classification process to facilitate analysis of the imaging data 114 and/or the multi-channel imaging data. For example, the discriminator component 106 can employ a probabilistic and/or statistical-based analysis (e.g., factoring into the analysis utilities and costs) to learn and/or generate inferences with respect to the imaging data 114 and/or the multi-channel imaging data. The discriminator component 106 can employ, for example, a support vector machine (SVM) classifier to learn and/or generate inferences for the imaging data 114 and/or the multi-channel imaging data. Additionally or alternatively, the discriminator component 106 can employ other classification techniques associated with Bayesian networks, decision trees and/or probabilistic classification models. Classifiers employed by the discriminator component 106 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, $x=(x1, x2, x3, x4, xn)$, to a confidence that the input belongs to a class—that is, $f(x)=confidence(class)$.

The training component 108 can employ the first predicted label or the second predicted label for the imaging data 114 to train a generative artificial intelligence model. Additionally or alternatively, the training component 108 can employ the first predicted label or the second predicted label for the synthetic multi-channel data to train the generative artificial intelligence model. The generative artificial intelligence model can be a model for a generative network. For example, the generative artificial intelligence model can be a model for a generative adversarial network. The generative network (e.g., the generative adversarial network) can be employed to generate images and/or corresponding annotations for the images. For example, the generative network (e.g., the generative adversarial network) can be employed to generate medical images and/or corresponding annotations for the medical images. In an embodiment, the training component 108 can generate and/or utilize a loss function to tune the generative artificial intelligence model based on the first predicted label or the second predicted label for the imaging data 114. For example, the training component 108 can generate and/or utilize a loss function to tune a discriminator of a generative adversarial network (e.g., to tune a convolutional neural network for a discriminator of a generative adversarial network) based on the first predicted label or the second predicted label for the imaging data 114. The loss function associated with the imaging data 114 can be, for example, a cross-entropy error function. Furthermore, the generative adversarial network can be modified based on the loss function associated with the imaging data 114 to improve classification output from the generative adversarial network. Additionally or alternatively, the training component 108 can generate and/or utilize a loss function to tune the generative artificial intelligence model based on the first predicted label or the second predicted label for the multi-channel imaging data. For example, the training component 108 can generate and/or utilize a loss function to tune a multi-channel generator of a generative adversarial network (e.g., to tune a convolutional neural network for a multi-channel generator of a generative adversarial network) based on the first predicted label or the second predicted label for the synthetic multi-channel data. The loss function associated with the synthetic multi-channel data can be, for example, a cross-entropy error function. Furthermore, the generative adversarial network can be modified based on the loss function associated with the synthetic multi-channel data to improve generation of an image from a data distribution associated with the generative adversarial network. In certain embodiments, a loss function generated by the training component 108 can include a set of weights to tune one or more parameters of the generative artificial intelligence model. In an embodiment, the generative modeling component 102 can generate a generative model 118. For example, the generative model 118 can be the generative artificial intelligence model trained by the training component 108. In certain embodiments, the generative model 118 can be associated with the loss function related to the imaging data 114 and/or the loss function related to the synthetic multi-channel data.

It is to be appreciated that technical features of the generative modeling component 102 are highly technical in nature and not abstract ideas. Processing threads of the generative modeling component 102 that process and/or analyze the imaging data 114 and/or the one or more latent random variables 116, etc. cannot be performed by a human (e.g., are greater than the capability of a single human mind). For example, the amount of the imaging data 114 processed, the speed of processing of the imaging data 114 and/or the data types of the imaging data 114 processed by the generative modeling component 102 over a certain period of time can be respectively greater, faster and different than the amount, speed and data type that can be processed by a single human mind over the same period of time. Furthermore, the imaging data 114 processed by the generative modeling component 102 can be one or more medical images generated by sensors of a medical imaging device. Moreover, the generative modeling component 102 can be fully operational towards performing one or more other functions (e.g., fully powered on, fully executed, etc.) while also processing the imaging data 114.

Figure 2:
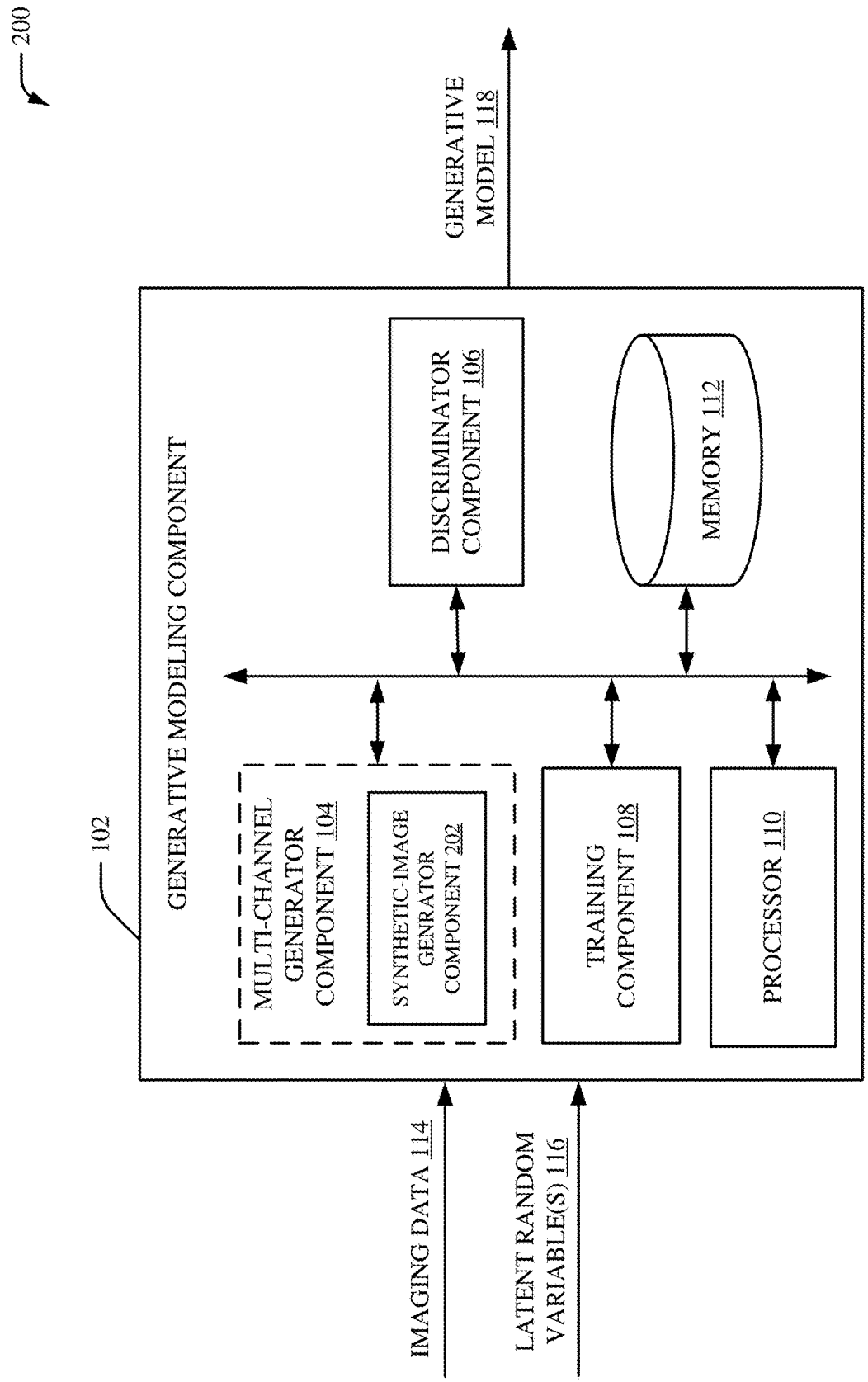
FIG. 2 illustrates a high-level block diagram of another example generative modeling component, in accordance with various aspects and implementations described herein.

Referring now to FIG. 2, there is illustrated a non-limiting implementation of a system 200 in accordance with various aspects and implementations of this disclosure. Repetitive description of like elements employed in other embodiments described herein is omitted for sake of brevity. The system 200 includes the generative modeling component 102. The generative modeling component 102 can include the multi-channel generator component 104, the discriminator component 106, the training component 108, the processor 110 and/or the memory 112. In the embodiment shown in FIG. 2, the multi-channel generator component 104 can include a synthetic-image generator component 202. The synthetic-image generator component 202 can generate one or more synthetic images based on the one or more latent random variables 116. In an aspect, the synthetic-image generator component 202 can generate a synthetic image for a data channel included in the synthetic multi-channel data. For example, the synthetic-image generator component 202 can generate a synthetic image for a first data channel of the synthetic multi-channel data. Furthermore, at least a second data channel of the synthetic multi-channel data can include a segmentation of the synthetic image generated by the synthetic-image generator component 202. In an embodiment, the synthetic-image generator component 202 can generate one or more synthetic images based on a data distribution (e.g., a probability distribution) associated with the one or more latent random variables 116. For instance, the synthetic-image generator component 202 can generate one or more synthetic images based on a vector of data associated with the one or more latent random variables 116. In another embodiment, the synthetic-image generator component 202 can generate one or more synthetic images based on a random data distribution associated with the one or more latent random variables 116. For example, in an embodiment, the synthetic-image generator component 202 can generate one or more synthetic images based on a random vector of data (e.g., a vector of random data values) associated with the one or more latent random variables 116. In yet another embodiment, the synthetic-image generator component 202 can generate one or more synthetic images based on a set of latent random variables associated with the one or more latent random variables 116.

Figure 3:
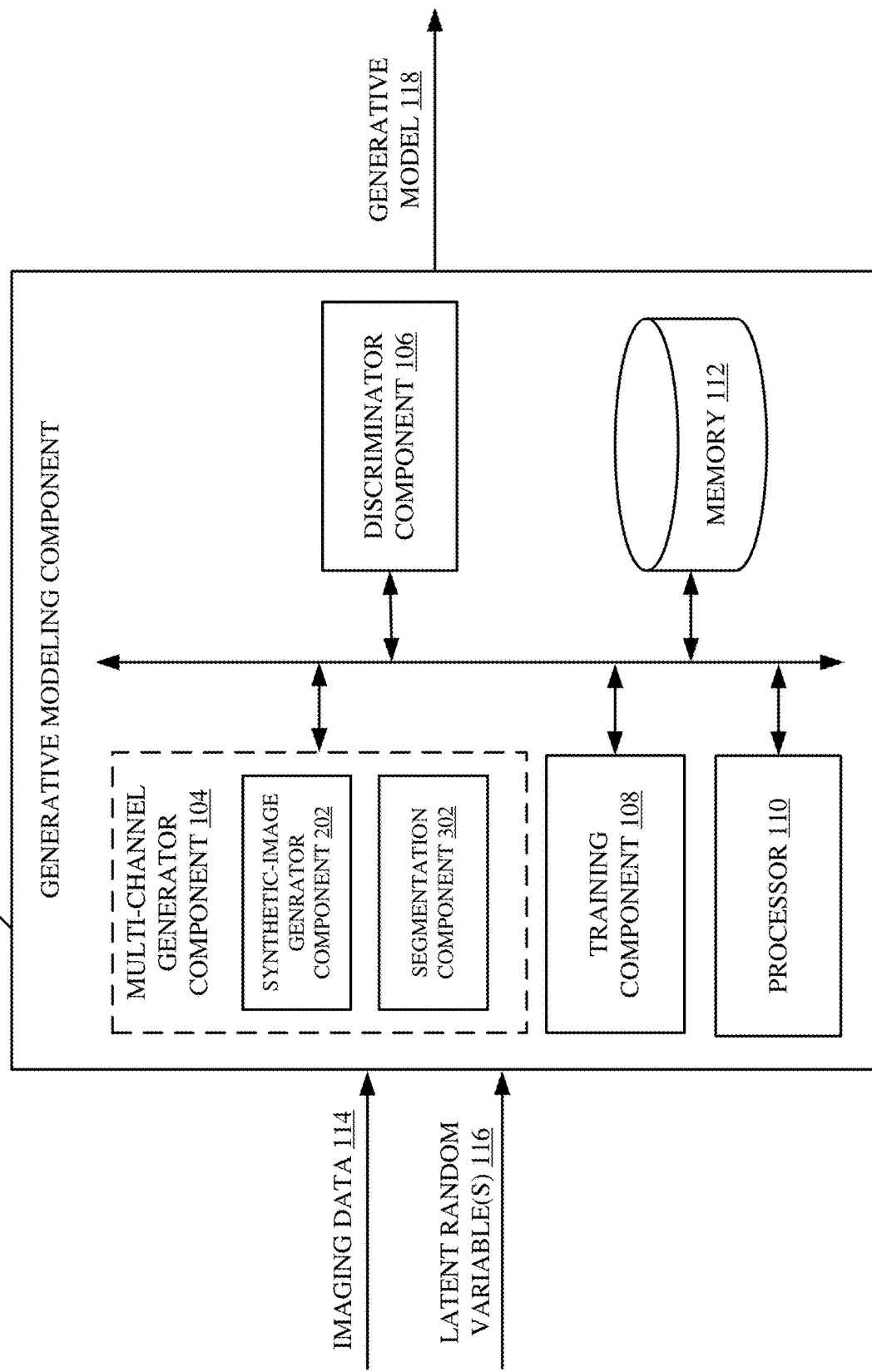
FIG. 3 illustrates a high-level block diagram of yet another example generative modeling component, in accordance with various aspects and implementations described herein.

Referring now to FIG. 3, there is illustrated a non-limiting implementation of a system 300 in accordance with various aspects and implementations of this disclosure. Repetitive description of like elements employed in other embodiments described herein is omitted for sake of brevity. The system 300 includes the generative modeling component 102. The generative modeling component 102 can include the multi-channel generator component 104, the discriminator component 106, the training component 108, the processor 110 and/or the memory 112. In the embodiment shown in FIG. 3, the multi-channel generator component 104 can include the synthetic-image generator component 202 and/or a segmentation component 302. The segmentation component 302 can generate one or more segmentations associated with the one or more synthetic images generated by the synthetic-image generator component 202. In an aspect, the segmentation component 302 can generate segmentation data for one or more data channels included in the synthetic multi-channel data. For example, the segmentation component 302 can generate first segmentation data indicative of a segmentation for the synthetic image generated by the synthetic-image generator component 202. The first segmentation data can be included in a data channel (e.g., a second data channel) of the synthetic multi-channel data. Additionally, the segmentation component 302 can generate second segmentation data indicative of a remaining segmentation for the synthetic image generated by the synthetic-image generator component 202. The second segmentation data can be included in a different data channel (e.g., a third data channel) of the synthetic multi-channel data. A segmentation generated by the segmentation component 302 can correspond to an annotation for the synthetic image generated by the synthetic-image generator component 202.

In another embodiment, the segmentation component 302 can additionally or alternatively generate one or more segmentations associated with the imaging data 114. For example, the segmentation component 302 can additionally or alternatively generate one or more segmentations for one or more real images included in the imaging data 114. In an aspect, the segmentation component 302 can generate segmentation data for one or more data channels included in the imaging data 114. For example, the segmentation component 302 can generate first segmentation data indicative of a segmentation for a real image included in the imaging data 114 (e.g., a real image included in a first data channel of the imaging data 114). The first segmentation data can be included in a data channel (e.g., a second data channel) of the imaging data 114. Additionally, the segmentation component 302 can generate second segmentation data indicative of a remaining segmentation for the real image included in the imaging data 114. The second segmentation data can be included in a different data channel (e.g., a third data channel) of the imaging data 114. A segmentation generated by the segmentation component 302 can additionally or alternatively correspond to an annotation for the real image included in the imaging data 114.

Figure 4:
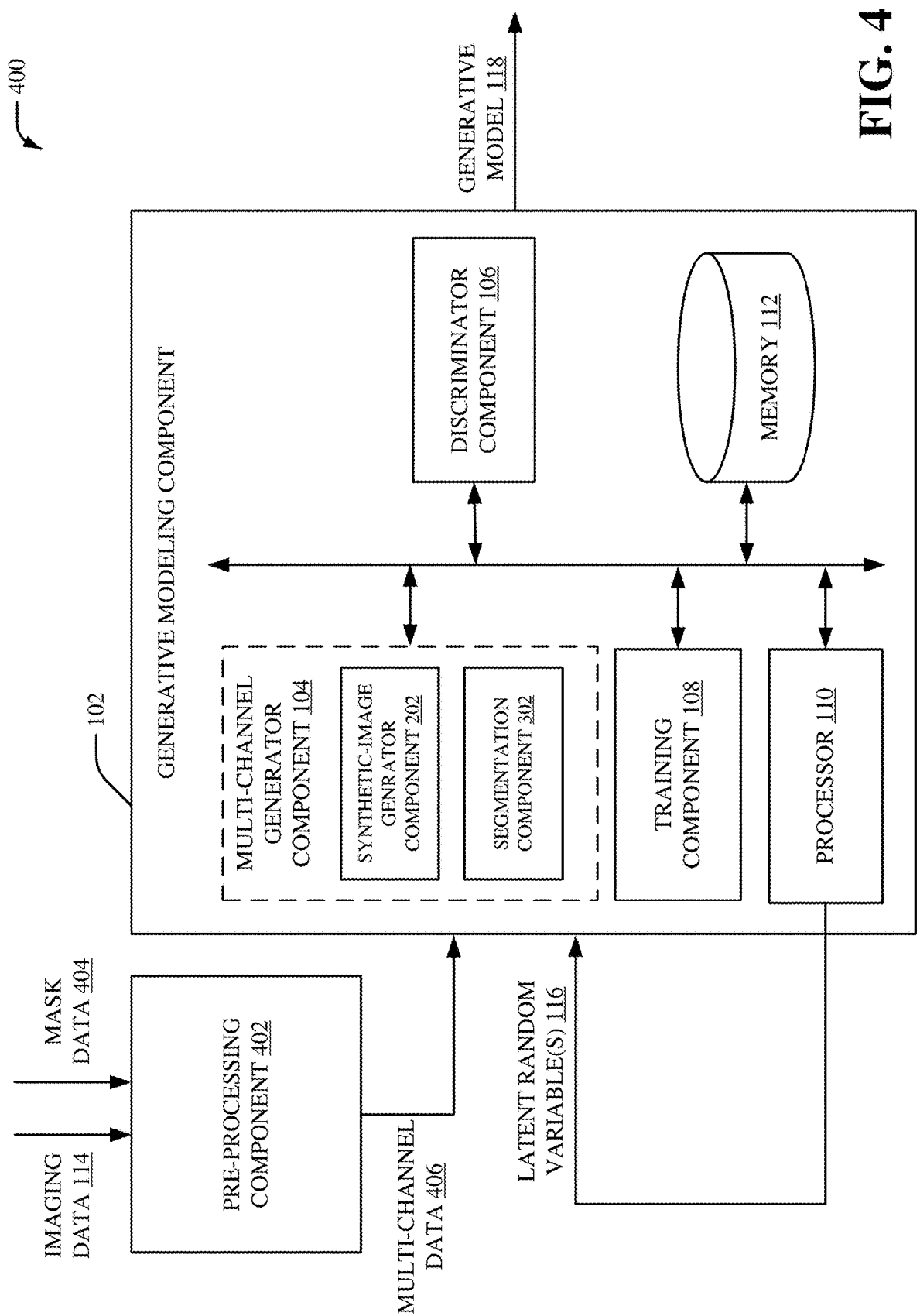
FIG. 4 illustrates a high-level block diagram of yet another example generative modeling component, in accordance with various aspects and implementations described herein.

Referring now to FIG. 4, there is illustrated a non-limiting implementation of a system 400 in accordance with various aspects and implementations of this disclosure. Repetitive description of like elements employed in other embodiments described herein is omitted for sake of brevity. The system 400 includes the generative modeling component 102 and a pre-processing component 402. The generative modeling component 102 can include the multi-channel generator component 104, the discriminator component 106, the training component 108, the processor 110 and/or the memory 112. In the embodiment shown in FIG. 4, the multi-channel generator component 104 can include the synthetic-image generator component 202 and/or the segmentation component 302. In certain embodiments, the generative modeling component 102 (e.g., the processor 110 of the generative modeling component 102) can generate the one or more latent random variables 116. The pre-processing component 402 can receive the imaging data 114 and/or mask data 404. Based on the imaging data 114 and/or the mask data 404, the pre-processing component 402 can prepare multi-channel data 406. The multi-channel data 406 can be provided to the generative modeling component 102. The mask data 404 can include one or more ground truth masks for one or more images included in the imaging data 114. In an embodiment, the mask data 404 can be a set of masks from a plurality of objects. For example, each medical image from the imaging data 114 can be associated with one or more masks. A mask included in the mask data 404 can be a filter to mask one or more regions in an image (e.g., in the imaging data 114). For instance, a mask included in the mask data 404 can include one or more weights for one or more regions of interest in an image (e.g., in the imaging data 114). In one example, a mask included in the mask data 404 can include a set of pixels that define a location for region of interests using binary filtering. The multi-channel data 406 can be multi-channel imaging data. For example, the multi-channel data 406 can be a multi-channel data sample of a real image included in the imaging data 114. The multi-channel data 406 can additionally or alternatively include one or more segmentations of the real image included in the imaging data 114. For example, in an embodiment, the multi-channel data 406 can include a first data channel associated with a real image, a second data channel associated with first segmentation data indicative of a segmentation for the real image, and a third data channel associated with second segmentation data indicative of a remaining segmentation for the real image.

Figure 5:
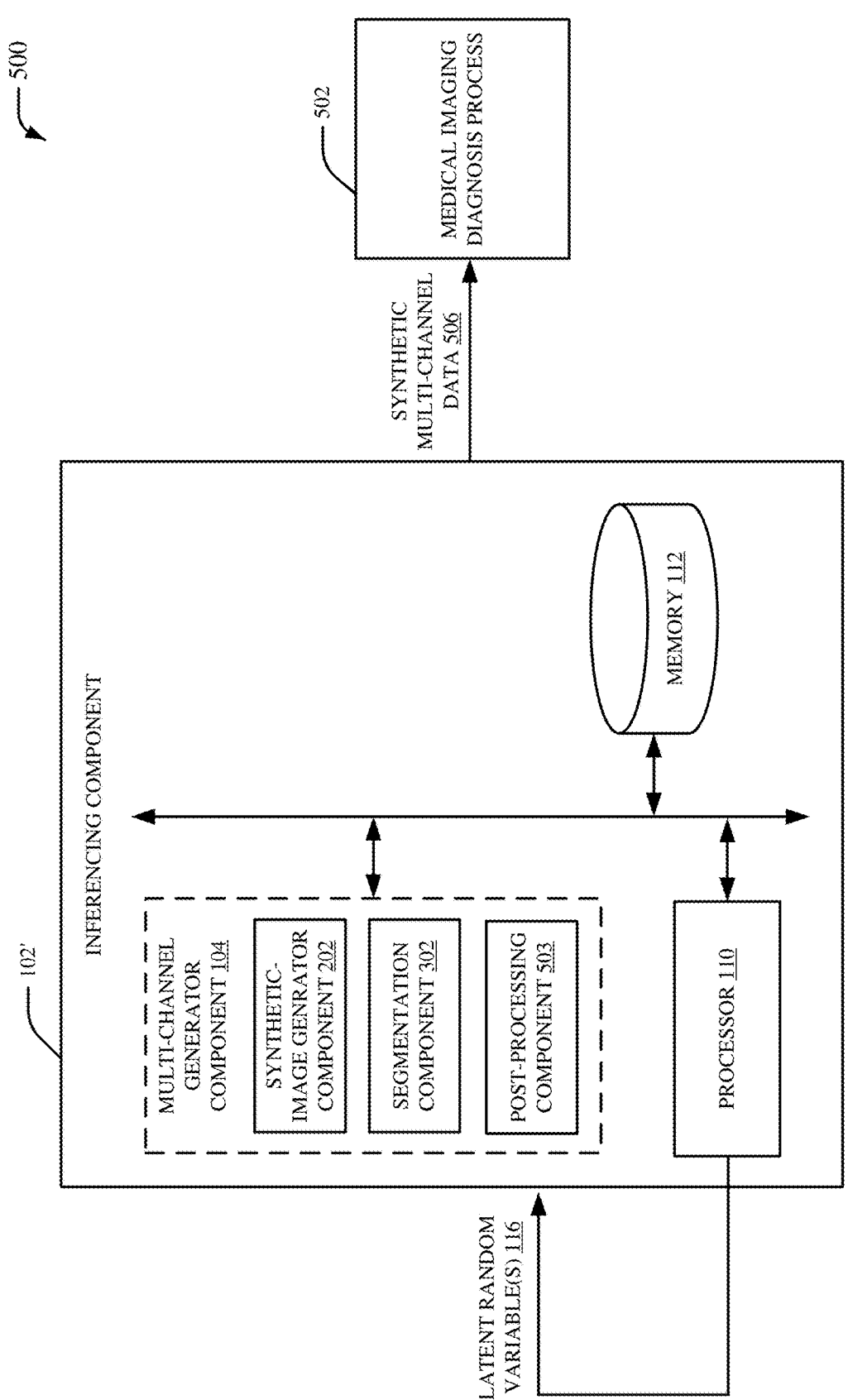
FIG. 5 illustrates a system that includes an example generative modeling based inferencing component and an example medical imaging diagnosis process, in accordance with various aspects and implementations described herein.

Referring now to FIG. 5, there is illustrated a non-limiting implementation of a system 500 in accordance with various aspects and implementations of this disclosure. Repetitive description of like elements employed in other embodiments described herein is omitted for sake of brevity. The system 500 includes an inferencing component 102' and medical imaging diagnosis process 502. The inferencing component 102' can be an alternate embodiment of the generative modeling component 102. For example, the inferencing component 102' can be employed for an inferencing phase and/or can be employed as a generative modeling based inferencing component. The inferencing component 102' can include the multi-channel generator component 104, the processor 110 and/or the memory 112. In certain embodiments, the inferencing component 102' can additionally include the discriminator component 106. In the embodiment shown in FIG. 5, the multi-channel generator component 104 can include the synthetic-image generator component 202, the segmentation component 302 and/or a post-processing component 503. In certain embodiments, the medical imaging diagnosis process 502 can be a component (e.g., a medical imaging diagnosis component) included in the inferencing component 102'. The generative modeling 102 can provide synthetic multi-channel data 506 and/or other information to the medical imaging diagnosis process 502.

The post-processing component 503 can generate mask data associated with the segmentation data generated by the segmentation component 302. For example, the post-processing component 503 can generate one or more masks for the one or more segmentations generated by the segmentation component 302. A mask generated by the post-processing component 503 can be a binary mask that corresponds to an annotation associated with a segmentation. In an embodiment, the post-processing component 503 can generate first mask data indicative of a first mask (e.g., a first ground truth mask) for the first segmentation data indicative of the segmentation for the synthetic image generated by the synthetic-image generator component 202. Additionally, the post-processing component 503 can generate second mask data indicative of a second mask (e.g., a second ground truth mask) for the second segmentation data indicative of the remaining segmentation for the synthetic image generated by the synthetic-image generator component 202. A mask generated by the post-processing component 503 for the synthetic multi-channel data can be a filter to mask one or more regions in the synthetic image generated by the synthetic-image generator component 202. For instance, a mask included in the synthetic image generated by the synthetic-image generator component 202 can include a binary weight for a segmentation in the synthetic image generated by the synthetic-image generator component 202. In one example, a mask included in the synthetic image generated by the synthetic-image generator component 202 can include a set of pixels that define a location for a segmentation for the synthetic image using binary filtering.

In another embodiment, the post-processing component 503 can additionally or alternatively generate first mask data indicative of a first mask (e.g., a first ground truth mask) for the first segmentation data indicative of the segmentation for the real image included in the imaging data 114. Additionally, the post-processing component 503 can generate second mask data indicative of a second mask (e.g., a second ground truth mask) for the second segmentation data indicative of the remaining segmentation for the real image included in the imaging data 114. A mask included in the imaging data 114 can be a filter to mask one or more regions in the real image included in the imaging data 114. For instance, a mask included in the imaging data 114 can include a binary weight for a segmentation in the real image included in the imaging data 114. In one example, a mask included in the imaging data 114 can include a set of pixels that define a location for a segmentation associated with the real image using binary filtering. Mask data and/or other information generated by the multi-channel generator component 104 (e.g., the synthetic-image generator component 202, the segmentation component 302 and/or the post-processing component 503) can be included in the synthetic multi-channel data 506. For instance, the synthetic multi-channel data 506 can be a multi-channel data sample. In an aspect, the synthetic multi-channel data 506 can include a synthetic version of imaging data (e.g., an image). Additionally, the synthetic multi-channel data 506 can include one or more segmentations of the synthetic version of the imaging data. The synthetic version of the imaging data and the one or more segmentations can be associated with unique data channels. For example, in an embodiment, the synthetic multi-channel data 506 can include a first data channel associated with a synthetic image, a second data channel associated with first segmentation data indicative of a segmentation for the synthetic image, and a third data channel associated with second segmentation data indicative of a remaining segmentation for the synthetic image.

The medical imaging diagnosis process 502 can employ the synthetic multi-channel data 506 and/or other information provided by the generative modeling component 102 to facilitate classification, localization, detection and/or segmentation of one or more features associated with an input image. In an embodiment, the medical imaging diagnosis process 502 can perform deep learning to facilitate classification, localization, detection and/or segmentation of one or more diseases associated with an input image (e.g., a medical image). In another embodiment, the medical imaging diagnosis process 502 can perform deep learning based on a convolutional neural network that receives an input image (e.g., a medical image). A disease classified and/or localized by the medical imaging diagnosis process 502 can include, for example, a lung disease, a heart disease, a tissue disease, a bone disease, a tumor, a cancer, tuberculosis, cardiomegaly, hypoinflation of a lung, opacity of a lung, hyperdistension, a spine degenerative disease, calcinosis, or another type of disease associated with an anatomical region of a patient body. In an aspect, the medical imaging diagnosis process 502 can determine a prediction for a disease associated with an input image (e.g., a medical image). For instance, the medical imaging diagnosis process 502 can determine a probability score for a disease associated with an input image (e.g., a medical image). In an example, the medical imaging diagnosis process 502 can determine a first percentage value representing likelihood of a negative prognosis for the disease and a second value representing a likelihood of a positive prognosis for the disease.

In certain embodiments, the medical imaging diagnosis process 502 can generate a multi-dimensional visualization associated with classification and/or localization of one or more diseases associated with an input image (e.g., a medical image). For instance, the medical imaging diagnosis process 502 can generate a human-interpretable visualization associated with classification and/or localization of one or more diseases associated with an input image (e.g., a medical image). Additionally or alternatively, the medical imaging diagnosis process 502 can generate a human-interpretable visualization of an input image (e.g., a medical image). In an embodiment, the medical imaging diagnosis process 502 can generate deep learning data based on a classification and/or a localization for a portion of an anatomical region associated with the input image. The deep learning data can include, for example, a classification and/or a location for one or more diseases located in the input image. In certain embodiments, the deep learning data can include probability data indicative of a probability for one or more diseases being located in the input image. The probability data can be, for example, a probability array of data values for one or more diseases being located in an input image (e.g., a medical image). The multi-dimensional visualization can be a graphical representation of an input image (e.g., a medical image) that shows a classification and/or a location of one or more diseases with respect to a patient body. The medical imaging diagnosis process 502 can also generate a display of the multi-dimensional visualization of the diagnosis provided by a medical imaging diagnosis process 502. For example, the medical imaging diagnosis process 502 can render a 2D visualization of a portion of an anatomical region on a user interface associated with a display of a user device such as, but not limited to, a computing device, a computer, a desktop computer, a laptop computer, a monitor device, a smart device, a smart phone, a mobile device, a handheld device, a tablet, a wearable computing device, a portable computing device or another type of user device associated with a display. In an aspect, the multi-dimensional visualization can include deep learning data. In another aspect, the deep learning data can also be rendered on the 3D model as one or more dynamic visual elements. The medical imaging diagnosis process 502 can, in an embodiment, alter visual characteristics (e.g., color, size, hues, shading, etc.) of at least a portion of the deep learning data associated with the multi-dimensional visualization based on the classification and/or the localization for the portion of the anatomical region. For example, the classification and/or the localization for the portion of the anatomical region can be presented as different visual characteristics (e.g., colors, sizes, hues or shades, etc.), based on a result of deep learning and/or the medical imaging diagnosis process 502. In another aspect, the medical imaging diagnosis process 502 can allow a user to zoom into or out with respect to the deep learning data associated with the multi-dimensional visualization. For example, the medical imaging diagnosis process 502 can allow a user to zoom into or out with respect to a classification and/or a location of one or more diseases identified in the anatomical region of the patient body. As such, a user can view, analyze and/or interact with the deep learning data associated with the multi-dimensional visualization for an input image (e.g., a medical image).

Figure 6:
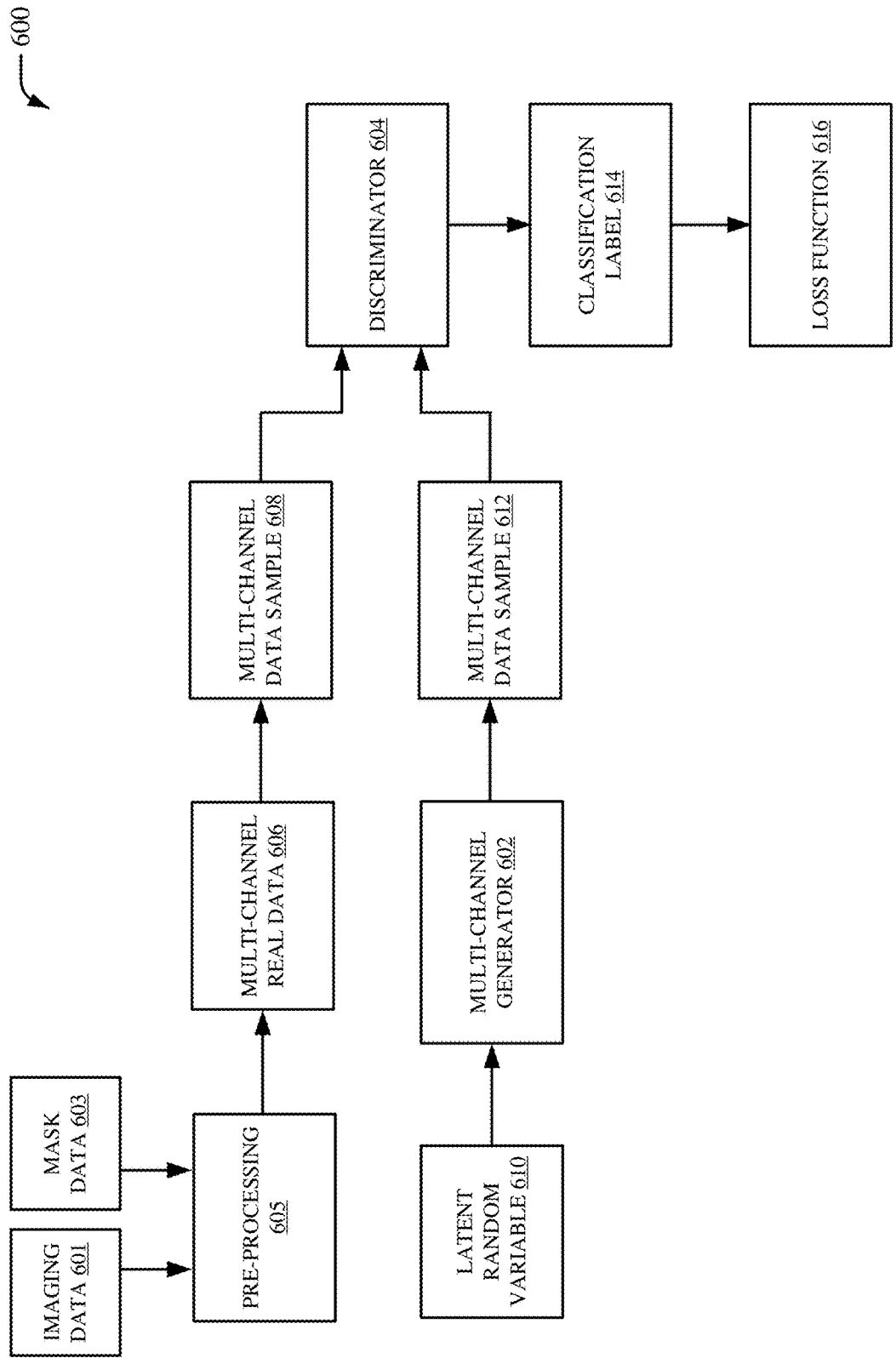
FIG. 6 illustrates an example system associated with a generative network associated with training, in accordance with various aspects and implementations described herein.

Referring now to FIG. 6, there is illustrated a non-limiting implementation of a system 600 in accordance with various aspects and implementations of this disclosure. Repetitive description of like elements employed in other embodiments described herein is omitted for sake of brevity. The system 600 can represent a generative network. For example, the system 600 can represent a generative adversarial network. The system 600 can include a multi-channel generator 602 and a discriminator 604. The multi-channel generator 602 can be associated with the multi-channel generator component 104. The discriminator 604 can be associated with the discriminator component 106. The multi-channel generator 602 can be a convolutional neural network that generates a multi-channel data sample 612 based on a latent random variable 610. The multi-channel data sample 612 can be, for example, the synthetic multi-channel data generated by the multi-channel generator component 104. The latent random variable 610 can be included in the one or more latent random variables 116, for example. In one example, the latent random variable 610 can be a latent code that facilitates generation of a unique synthetic image. The discriminator 604 can be a convolutional neural network that classifies a multi-channel data sample 608 from the multi-channel data sample 612. For example, the discriminator 604 can generate a classification label 614 that corresponds to classification for the multi-channel data sample 608 from the multi-channel data sample 612. The classification label 614 can be a first classification label (e.g., a "real" classification label) or a second classification label (e.g., a "fake" classification label) for the multi-channel data sample 608 and/or the multi-channel data sample 612. The multi-channel data sample 608 can be generated based on multi-channel real data 606. The multi-channel real data 606 and/or the multi-channel data sample 608 can correspond to the imaging data 114.

Figure 7:
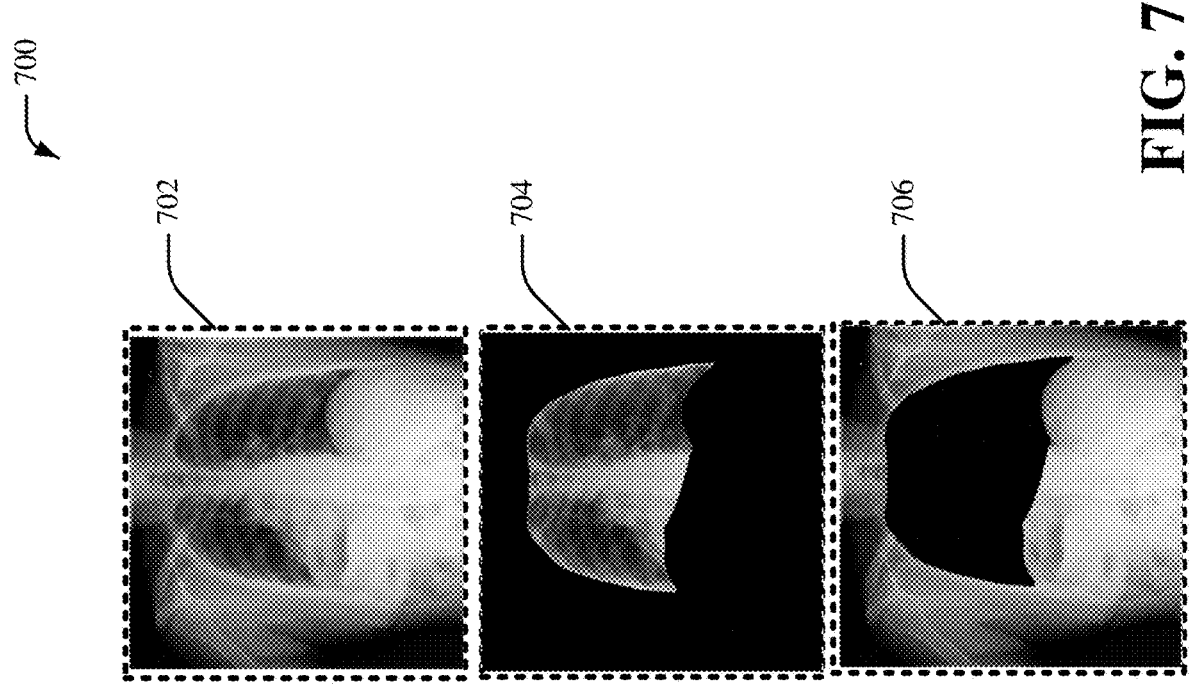
FIG. 7 illustrates an example system associated with a multi-channel generator for inferencing, in accordance with various aspects and implementations described herein.

In an embodiment, a loss function 616 can be generated based on the classification label 614. The loss function 616 can be one or more loss functions generated by the training component 108. In an embodiment, the multi-channel real data 606 can be a real image (e.g., a real medical image). In certain embodiments, pre-processing 605 can be performed to prepare the multi-channel real data 606. For instance, the pre-processing 605 can prepare the multi-channel real data 606 based on imaging data 601 and/or mask data 603. The mask data 603 can include one or more corresponding masks for one or more images included in the imaging data 601. Furthermore, the multi-channel data sample 608 can include multiple data channels. For instance, the multi-channel data sample 608 can include a data channel that includes the real image (e.g., the real medical image). The multi-channel data sample 608 can also include one or more data channels that include a segmentation for the real image. In certain embodiments, the multi-channel data sample 608 can also include one or more data channels that include a mask for a segmentation for the real image. In another embodiment, the multi-channel data sample 612 can include multiple data channels. For instance, the multi-channel data sample 612 can include a data channel that includes the synthetic image (e.g., the synthetic medical image). The multi-channel data sample 612 can also include one or more data channels that include a segmentation for the synthetic image. In certain embodiments, the multi-channel data sample 612 can also include one or more data channels that include a mask for a segmentation for the synthetic image. In certain embodiments, the loss function 616 can tune the multi-channel generator 602 and/or the discriminator 604. In one example, the loss function 616 can be an error gradient to modify one or more parameters for the multi-channel generator 602 and/or the discriminator 604. For instance, the loss function 616 can be generated based on the multi-channel data sample 608 and/or the multi-channel data sample 612 to tune the generative network. In certain embodiments, the discriminator 604 can be discarded from the generative network in response to a determination that the multi-channel generator 602 is trained. For example, in an embodiment associated with an inferencing phase, the discriminator 604 can be discarded from the generative network in response to a determination that the multi-channel generator 602 is trained Referring now to FIG. 7, there is illustrated a non-limiting implementation of a system 700 in accordance with various aspects and implementations of this disclosure. Repetitive description of like elements employed in other embodiments described herein is omitted for sake of brevity. The system 700 can be employed, for example, during an inferencing phase. The system 700 can include the multi-channel generator 602. In an embodiment, the multi-channel generator 602 can generate a synthetic image 702, a segmentation 704 and a segmentation 706. For instance, the multi-channel generator component 104 can generate the synthetic image 702, the segmentation 704 and the segmentation 706. The multi-channel generator 602 can, for example, generate the synthetic image 702 based on the latent random variable 610 and/or other data (e.g., the one or more latent random variables 116). The synthetic image 702 can be, for example, a synthetic medical image (e.g., a synthetic x-ray image, etc.). The segmentation 704 can be a segmentation of the synthetic image 702. For example, the segmentation 704 can correspond to an annotation of the synthetic image 702. The segmentation 706 can be a remaining segmentation of the synthetic image 702. For example, the segmentation 706 can be a complementary segmentation as compared to the segmentation 704. In an embodiment, the synthetic image 702 can be included in a first data channel of the synthetic multi-channel data (e.g., the multi-channel data sample 612) generated by the multi-channel generator component 104.

The segmentation 704 can be included in a second data channel of the synthetic multi-channel data (e.g., the multi-channel data sample 612) generated by the multi-channel generator component 104. Furthermore, the segmentation 706 can be included in a third data channel of the synthetic multi-channel data (e.g., the multi-channel data sample 612) generated by the multi-channel generator component 104. As such, a concurrent image and corresponding multi-channel auxiliary data can be provided without intervention by a user to annotate at pixel level on a synthetic image. It is to be appreciated that, in certain embodiments, the multi-channel generator 602 can generate more than two segmentations (e.g., more than three data channels can be generated).

Figure 8:
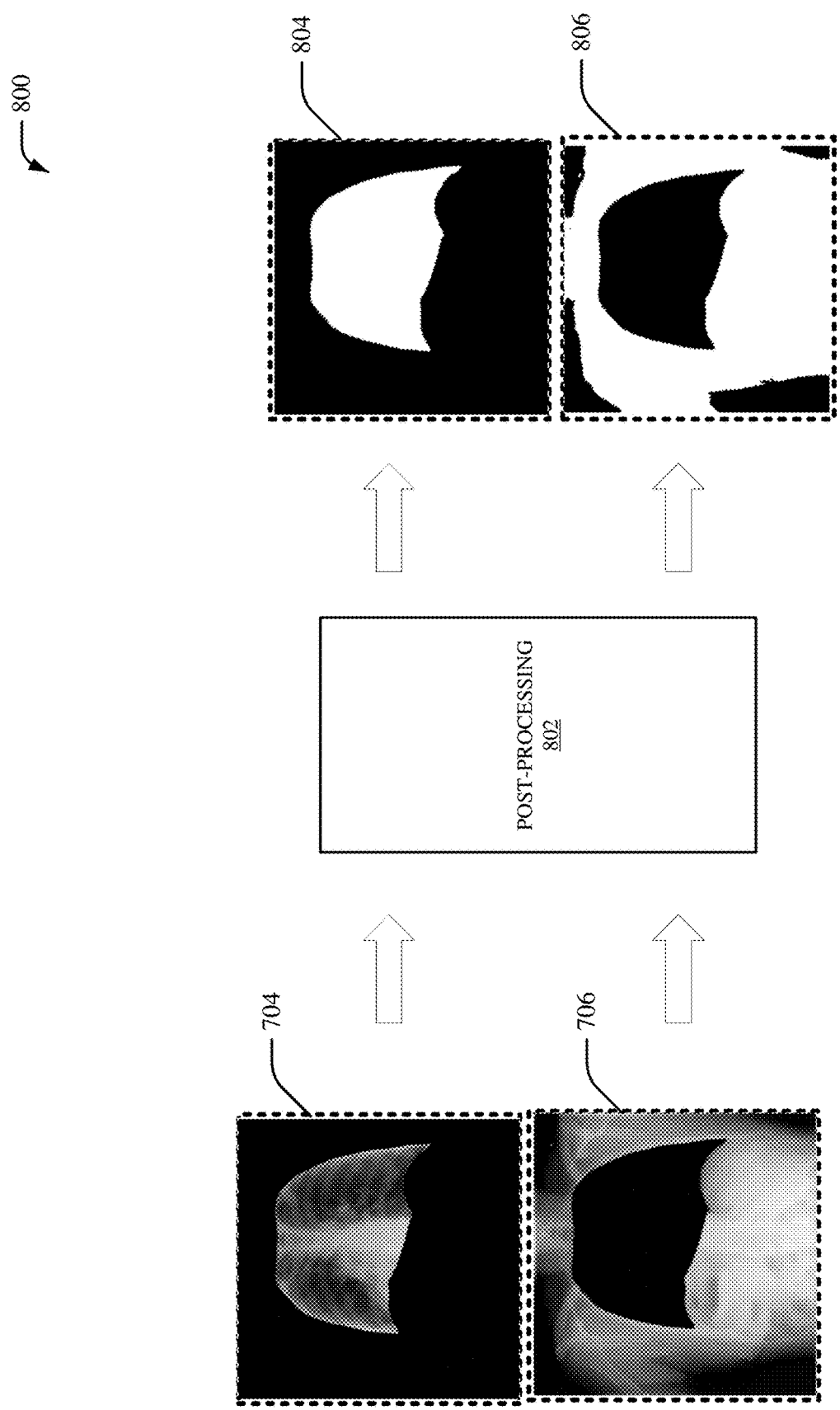
FIG. 8 illustrates an example system associated with post-processing for inferencing and/or binary mask generation, in accordance with various aspects and implementations described herein.

Referring now to FIG. 8, there is illustrated a non-limiting implementation of a system 800 in accordance with various aspects and implementations of this disclosure. Repetitive description of like elements employed in other embodiments described herein is omitted for sake of brevity. The system 800 can be employed, for example, during an inferencing phase (e.g., for binary mask generation). The system 800 can include post-processing 802. The post-processing 802 can be associated with the post-processing component 503. In an embodiment, the post-processing 802 can perform processing to generate a mask 804 based on the segmentation 704. Furthermore, the post-processing 802 can perform processing to generate a mask 806 based on the segmentation 706. The mask 806 can be an opposite mask as compared to the mask 804. For example, the mask 806 can be a complementary mask as compared to the mask 804. The mask 804 and/or the mask 806 can be employed, for example, for respective model training data. The mask 804 can be a binary mask that corresponds to an annotation associated with the segmentation 704. In one example, the mask 804 can be a ground truth mask that corresponds to an annotation associated with the segmentation 704. The mask 806 can be a binary mask that corresponds to an annotation associated with the segmentation 706. In one example, the mask 806 can be a ground truth mask that corresponds to an annotation associated with the segmentation 706. In an embodiment, the mask 804 can be included in a second data channel of the synthetic multi-channel data (e.g., the multi-channel data sample 612) generated by the multi-channel generator component 104. Furthermore, the mask 806 can be included in a third data channel of the synthetic multi-channel data (e.g., the multi-channel data sample 612) generated by the multi-channel generator component 104.

Figure 9:
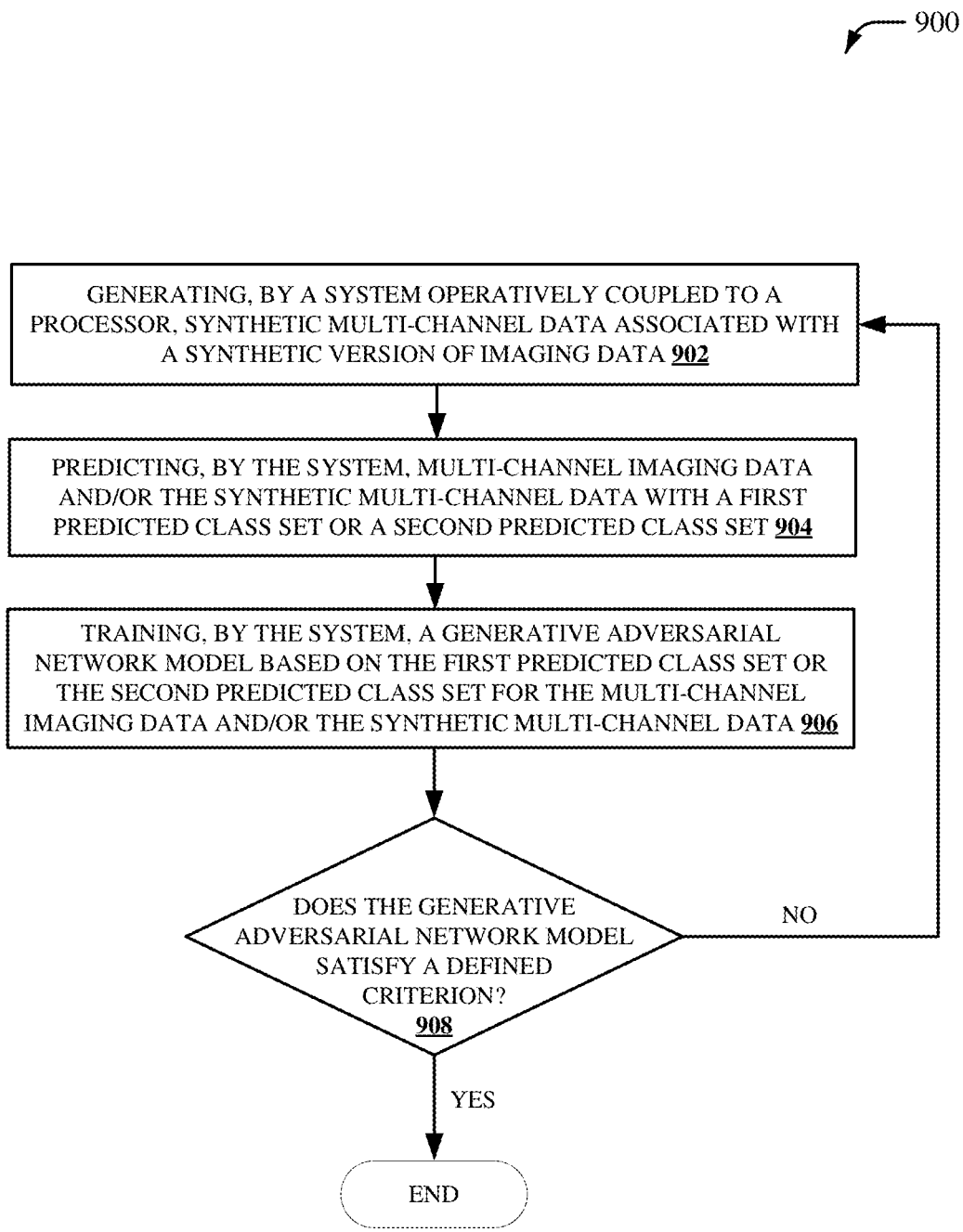
FIG. 9 depicts a flow diagram of an example method for providing concurrent image and corresponding multi-channel auxiliary data generation for a generative model, in accordance with various aspects and implementations described herein.

FIG. 9 illustrates a methodology and/or a flow diagram in accordance with the disclosed subject matter. For simplicity of explanation, the methodology is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodology in accordance with the disclosed subject matter. In addition, those skilled in the art will understand and appreciate that the methodology could alternatively be represented as a series of interrelated states via a state diagram or events. Additionally, it should be further appreciated that methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there is illustrated a non-limiting implementation of a methodology 900 for providing concurrent image and corresponding multi-channel auxiliary data generation for a generative model, according to an aspect of the subject innovation. At 902, synthetic multi-channel data associated with a synthetic version of imaging data is generated, by a system operatively coupled to a processor (e.g., by multi-channel generator component 104). The synthetic multi-channel data can be a multi-channel data sample. In an aspect, the synthetic multi-channel data can include a synthetic version of imaging data. Additionally, the synthetic multi-channel data can include one or more segmentations of the synthetic version of the imaging data. The synthetic version of the imaging data and the one or more segmentations can be associated with unique data channels. For example, in an embodiment, the synthetic multi-channel can include a first data channel associated with a synthetic image, a second data channel associated with first segmentation data indicative of a segmentation for the synthetic image, and a third data channel associated with second segmentation data indicative of a remaining segmentation for the synthetic image. In another embodiment, the synthetic multi-channel can include a first data channel associated with a synthetic image, a second data channel associated with first segmentation data indicative of a first segmentation for the synthetic image, a third data channel associated with second segmentation data indicative of a remaining portion of the first segmentation for the synthetic image, a fourth data channel associated with third segmentation data indicative of a second segmentation for the synthetic image, and a fifth data channel associated with fourth segmentation data indicative of a remaining portion of the second segmentation for the synthetic image.

At 904, multi-channel imaging data and/or the synthetic multi-channel data are predicted, by the system (e.g., by discriminator component 106), with a first predicted class set or a second predicted class set. In an embodiment, a class set can include a multi-channel image (e.g., channel level labels), an image label (e.g., image level labels) and/or clinical labels. The first predicted class set can be associated with a first classification (e.g., a first classification label) and the second predicted class set can be associated with a second classification (e.g., a second classification label). For example, an image level label can correspond to a "real" label for an image (e.g., a "real" classification label) or a "fake" label for an image (e.g., a "fake" classification label). In another example, a channel level label can correspond to a "real" label for a multi-channel image (e.g., a "real" classification label) or a "fake" label for a multi-channel image (e.g., a "fake" classification label). The multi-channel imaging data can be a multi-channel data sample. In an aspect, the multi-channel imaging data can include a real version of imaging data. Additionally, the multi-channel imaging data can include one or more segmentations of the real version of the imaging data. The real version of the imaging data and the one or more segmentations can be associated with unique data channels. For example, in an embodiment, the multi-channel imaging data can include a first data channel associated with a real image, a second data channel associated with first segmentation data indicative of a segmentation for the real image, and a third data channel associated with second segmentation data indicative of a remaining segmentation for the real image. In another embodiment, the multi-channel imaging data can include a first data channel associated with a real image, a second data channel associated with first segmentation data indicative of a first segmentation for the real image, a third data channel associated with second segmentation data indicative of a remaining portion of the first segmentation for the real image, a fourth data channel associated with third segmentation data indicative of a second segmentation for the real image, and a fifth data channel associated with fourth segmentation data indicative of a remaining portion of the second segmentation for the real image. The real image can be a two-dimensional image or a three-dimensional image generated by one or more medical imaging devices. For instance, the real image can be electromagnetic radiation imagery captured via a set of sensors (e.g., a set of sensors associated with a medical imaging device). The real image can be received directly from one or more medical imaging devices. Alternatively, the real image can be stored in one or more databases that receives and/or stores the real image associated with the one or more medical imaging devices. A medical imaging device can be, for example, an x-ray device, a CT device, another type of medical imaging device, etc.

At 906, a generative adversarial network model is trained, by the system (e.g., by training component 108), based on the first predicted class set or the second predicted class set for the multi-channel imaging data and/or the synthetic multi-channel data. The generative adversarial network model can be, for example, a generative network. The generative adversarial network model can be employed to generate images and/or corresponding annotations for the images. For example, the generative adversarial network model can be employed to generate medical images and/or corresponding annotations for the medical images. In an embodiment, a loss function can be generated based on the first predicted label or the second predicted label for the for the multi-channel imaging data and/or the synthetic multi-channel data. The loss function can be employed to tune the generative artificial intelligence model. For example, a multi-channel generator or a discriminator of the generative artificial intelligence model can be tuned based on the first predicted label or the second predicted label for the for the multi-channel imaging data and/or the synthetic multi-channel data. The loss function can be, for example, a cross-entropy error function. Furthermore, the loss function can be employed to improve classification output from the generative adversarial network model. In an embodiment, the loss function can be a loss function associated with loss between first data channel, the second data channel and/or the third data channel. In an embodiment, the loss function can be a loss function associated with loss between first data channel, the second data channel, the third data channel, the fourth data channel and/or the fifth data channel.

At 908, it is determined whether the generative adversarial network model satisfies a defined criterion. For example, it can be determined whether a multi-channel generator and/or a discriminator for the generative adversarial network model is adequately tuned. If no, the methodology 900 can return to 902. If yes, the methodology 900 can end. In certain embodiments, the methodology 900 can additionally or alternatively include generating first mask data indicative of a first ground truth mask for the first segmentation data. Furthermore, the methodology 900 can additionally or alternatively include generating second mask data indicative of a second ground truth mask for the second segmentation data.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
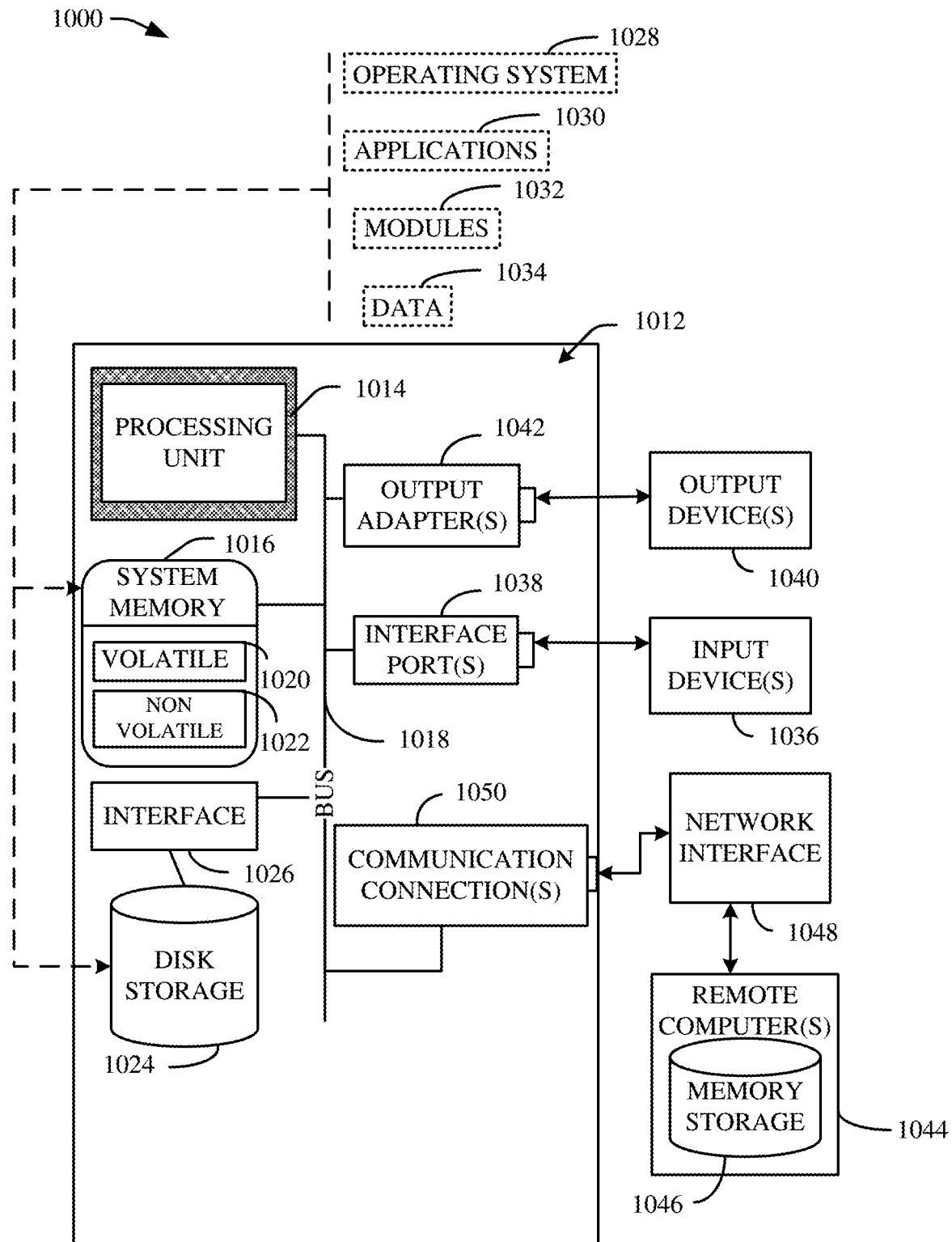
FIG. 10 is a schematic block diagram illustrating a suitable operating environment.
Figure 11:
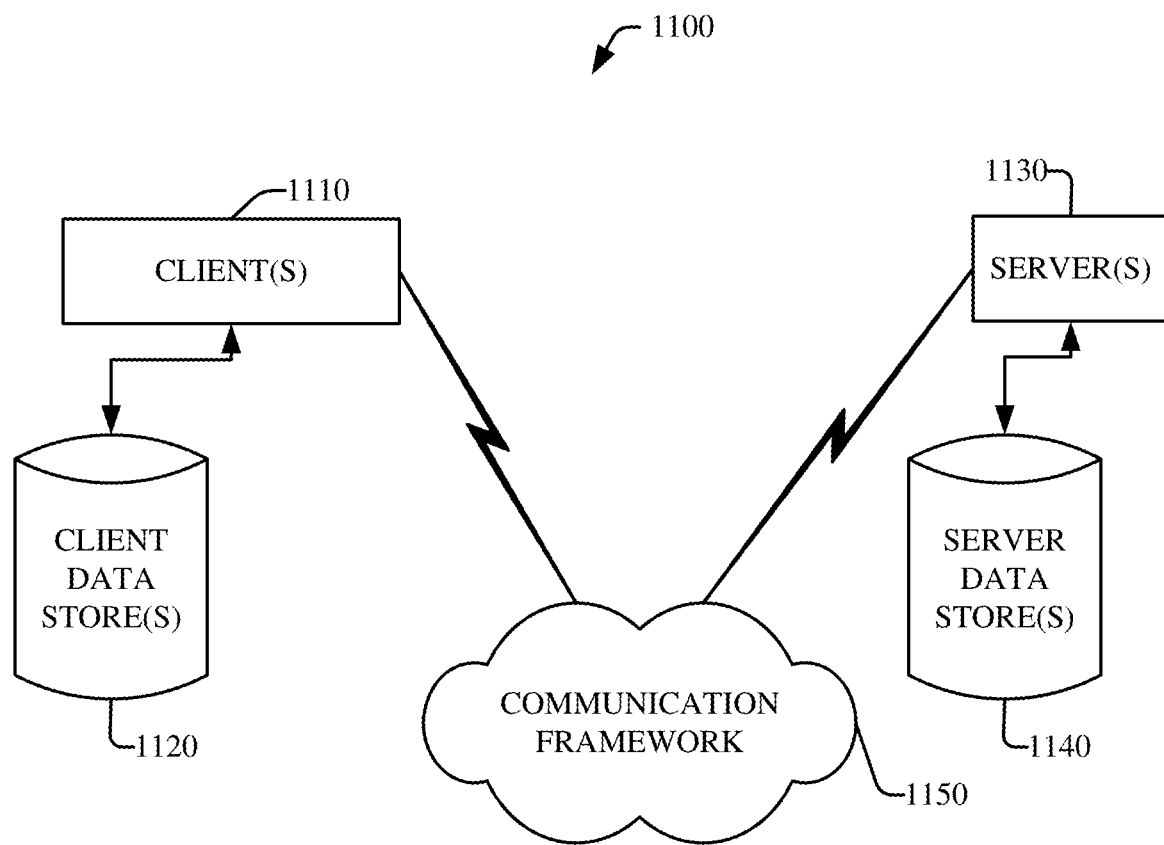
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

With reference to FIG. 10, a suitable environment 1000 for implementing various aspects of this disclosure includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/ software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory that stores computer executable components; and
a processor that executes the computer executable components stored in the memory, wherein the computer executable components comprise:
a multi-channel generator component that generates synthetic multichannel data associated with a synthetic version of imaging data;
a discriminator component that predicts multi-channel imaging data and the synthetic multi-channel data with a first predicted class set or a second predicted class set; and
a training component that employs the first predicted class set or the second predicted class set for the synthetic multi-channel data to train a generative adversarial network model;
wherein the multi-channel generator component generates a first data channel associated with a synthetic image, a second data channel associated with first segmentation data indicative of a segmentation for the synthetic image, and a third data channel associated with second segmentation data indicative of a remaining segmentation for the synthetic image; and
wherein the computer executable components further comprise:
a post-processing component that generates first mask data indicative of a first ground truth mask for the first segmentation data, and second mask data indicative of a second ground truth mask for the second segmentation data.

2. The system of claim 1, wherein the training component utilizes a loss function to tune the generative adversarial network model based on the first predicted class set or the second predicted class set for the synthetic multi-channel data.

3. The system of claim 1, wherein the discriminator component predicts the synthetic multi-channel data with the first predicted class set or the second predicted class set based on the first data channel associated with the synthetic image, the second data channel associated with the first segmentation data, and the third data channel associated with the second segmentation data.

4. The system of claim 1, wherein the training component tunes the generative adversarial network model based on a loss function associated with loss between first data channel, the second data channel and the third data channel.

5. The system of claim 1, wherein the computer executable components comprise:

a synthetic-image generator component that generates the synthetic image associated with the first data channel.

6. The system of claim 1, wherein the computer executable components comprise:
a segmentation component that generates the first segmentation data associated with the second data channel and the second segmentation data associated with the third data channel.

7. The system of claim 1, wherein the multi-channel generator component generates the synthetic multi-channel data based on a data distribution.

8. The system of claim 1, wherein the multi-channel generator component generates the synthetic multi-channel data based on a data distribution associated with a random vector.

9. A method, comprising using a processor operatively coupled to memory to execute computer executable components to perform the following acts:
generating synthetic multi-channel data associated with a synthetic version of imaging data;
predicting multi-channel imaging data and the synthetic multi-channel data with a first predicted class set or a second predicted class set; and
training a generative adversarial network model based on the first predicted class set or the second predicted class set for the synthetic multi-channel data;
wherein the generating the synthetic multi-channel data comprises:
generating a first data channel associated with a synthetic image,
generating a second data channel associated with first segmentation data indicative of a segmentation for the synthetic image, and
generating a third data channel associated with second segmentation data indicative of a remaining segmentation for the synthetic image;
wherein the method further comprises:
generating first mask data indicative of a first ground truth mask for the first segmentation data; and
generating second mask data indicative of a second ground truth mask for the second segmentation data.

10. The method of claim 9, further comprising utilizing a loss function to tune the generative adversarial network model based on the first predicted class set or the second predicted class set for the synthetic multi-channel data.

11. The method of claim 9, wherein the predicting the multi-channel imaging data comprises predicting the synthetic multi-channel data with the first predicted class set or the second predicted class set based on the first data channel associated with the synthetic image, the second data channel associated with the first segmentation data, and the third data channel associated with the second segmentation data.

12. The method of claim 9, further comprising tuning the generative adversarial network model based on a loss function associated with loss between first data channel, the second data channel and the third data channel.

13. A computer readable storage device comprising instructions that, in response to execution, cause a system comprising a processor to perform operations, comprising:
generating synthetic multi-channel data associated with a synthetic version of imaging data;
predicting multi-channel imaging data and the synthetic multi-channel data with a first predicted class set or a second predicted class set;
training a generative adversarial network model based on the first predicted class set or the second predicted class set for the synthetic multi-channel data;
wherein the generating the synthetic multi-channel data comprises:
generating a first data channel associated with a synthetic image,
generating a second data channel associated with first segmentation data indicative of a segmentation for the synthetic image, and
generating a third data channel associated with second segmentation data indicative of a remaining segmentation for the synthetic image;
generating first mask data indicative of a first ground truth mask for the first segmentation data; and
generating second mask data indicative of a second ground truth mask for the second segmentation data.

14. The computer readable storage device of claim 13, wherein the predicting the multi-channel imaging data comprises predicting the synthetic multi-channel data with the first predicted class set or the second predicted class set based on the first data channel associated with the synthetic image, the second data channel associated with the first segmentation data, and the third data channel associated with the second segmentation data.

15. The computer readable storage device of claim 13, further comprising tuning the generative adversarial network model based on a loss function associated with loss between first data channel, the second data channel and the third data channel.

* * * * *